Patented July 11, 1950

2,514,961

UNITED STATES PATENT OFFICE 2,514,961

RECOVERY OF ALDEHYDES

Nicolaas Max, Amsterdam, Netherlands, assignor to Shell Development Company, San Francisco, Calif., a corporation of Delaware No Drawing. Application April 15, 1949, Serial No. 87,827. In the Netherlands April 29, 1948

8 Claims. (Cl. 202—61)

This invention relates to the recovery of aldehydes from aldehyde-containing, crude, aldehydic reaction products obtained by the reaction between carbon monoxide, hydrogen and organic unsaturated compounds containing an olefinic unsaturation at an elevated temperature in the presence of a cobalt-containing catalyst.

The crude aldehydes, to the purification of which the present invention is directed, comprise the aldehydic reaction products obtained by the reaction between carbon monoxide, hydrogen and organic unsaturated compounds containing an olefinic unsaturation in the presence of a cobalt-containing catalyst. The aldehydic reaction products thus obtained consist of a complex mixture containing aldehydes in admixture with organic oxygen-containing reaction by-products such as ketones, alcohols, acids, etc., as well as some high boiling organic materials. Subjection of the reaction products to hydrogenation conditions converting aldehydes to alcohols provides a valuable source of highly desirable alcohols.

Utilization of the synthetic crude aldehydic reaction products as a source of aldehydes has been seriously handicapped, however, by inability to effect the efficient practical scale recovery therefrom of the aldehydes as such in a high state of purity. Subjection of the complex mixture of crude aldehydic reaction products to such practical scale separating means as simple distillation, fractionation, and the like, not only results in an aldehyde product which is lacking in a sufficient degree of purity, but it generally entails the loss of considerable proportions of the aldehydes originally present. Since the ability to utilize the aldehydes efficiently as a starting or intermediate material in many fields of application is dependent upon the substantial absence therein of contaminant materials, even in relatively small amounts, means enabling the separation of the aldehydes from the crude synthetic aldehydic reaction products in a high state of purity are of the utmost importance. Thus, the efficiency with which the aldehyde content of the crude mixture can be converted to the corresponding alcohols is dependent to at least a substantial degree upon the purity of the aldehydic product subjected to the hydrogenating conditions. Because of the impracticability of separating the aldehydes with any degree of efficiency in a high state of purity by such means as distillation, fractionation, and the like, research workers heretofore have resorted to the separation of desired aldehydes from the crude synthetic product by chemical processes wherein the aldehydes are first converted to compounds which are more easily separated from the mixture, and after their separation the compounds are again converted to the aldehyde. Thus, aldehydes of high purity are obtained by first converting the aldehydes to alcohols and thereafter converting the purified alcohols to the aldehyde form. Such methods are, however, highly impractical, not only because of the complexity and cost of operative steps involved but because of the considerable loss of aldehydes that is unavoidably occasioned thereby.

It is an object of the present invention to provide an improved process enabling the more efficient recovery of aldehydes in a high state of purity from reaction products obtained by the reaction between carbon monoxide, hydrogen, and an organic unsaturated compound containing an olefinic unsaturation at an elevated temperature in the presence of a cobalt-containing catalyst. A more particular object of the invention is the provision of an improved process enabling the more efficient recovery of aliphatic aldehydes contained in reaction products obtained by the reaction between carbon monoxide, hydrogen, and an olefinic hydrocarbon, in the presence of a cobalt catalyst. Other objects and advantages of the invention will become apparent from the following detailed description thereof.

In accordance with the process of the invention, aldehydes present in crude, aldehydic reaction products obtained by the reaction between carbon monoxide, hydrogen and an organic unsaturated compound containing an olefinic unsaturation, are recovered in a high degree of purity, with substantially improved efficiency, by heating the crude, aldehydic reaction products at a temperature in the range of from about 85 to about 160° C., and a pressure of from about 25 to 60 atmospheres, in the presence of an added gas which is free of any substantial amount of carbon monoxide and inert under the treating conditions, and thereafter separating aldehydes from the crude aldehydic mixture in a high state of purity by distillation. In a preferred method of carrying out the invention, hydrogen, or a hydrogen-containing gas, which is free of any substantial amount of carbon monoxide, is employed as the added gas within the prescribed temperature range under conditions avoiding any substantial aldehyde hydrogenation.

The crude aldehydes, to the purification of which the present invention is directed, comprise broadly the aldehydic reaction products obtained in the known manner by the reaction between carbon monoxide, hydrogen and an organic unsaturated compound having an olefinic unsaturation, at an elevated temperature in the presence of a cobalt-containing catalyst. Examples of unsaturated organic compounds employed in the production of such crude aldehydic reaction products comprise the olefinic hydrocarbon, as ethylene, propylene, butylenes, pentenes, hexenes, heptenes, octenes, nonenes, decenes and their homologues and anologues, etc. The aldehydes contained in the crude aldehydic reaction products will comprise aldehydes having one more carbon atom to the molecule than the organic unsaturated compound reacted with the carbon monoxide and hydrogen. Thus, when reacting carbon monoxide, hydrogen and an olefin, such as, for example, hexene, the aldehydic product will comprise the corresponding aliphatic aldehydes having seven carbon atoms to the molecule.

The crude aldehydic reaction products contain, in addition to the oxygen-containing reaction by-products, a substantial amount of complex cobalt compounds comprising, for example, cobalt carbonyls, formed during the interaction of the carbon monoxide, hydrogen and unsaturated compounds. These complexes entrained with, and/or dissolved in, the crude aldehydic reaction products, are not only highly volatile in nature, causing them to pass overhead during subsequent distillation of the crude aldehydic reaction products as such but are believed to contribute materially to the substantial loss of aldehydes suffered during such distillation by promoting or catalyzing, the condensation of the aldehydes to high boiling material. It has been found that cobalt complexes, in the form in which they are encountered in the crude aldehyde, will exert these detrimental effects and prevent any efficient recovery of aldehydes by distillation therefrom even when their concentration is as low as about 0.01% based on cobalt. The following examples are illustrative of the substantial loss of aldehydes encountered and impurity of product obtained, when attempting to recover aldehydes from the crude aldehydic reaction products by subjecting them as such to distillation.

*Example I*

A crude aldehydic reaction product, obtained by reacting a hexene fraction with carbon monoxide and hydrogen in the presence of a cobalt catalyst, which contained 46% of $C_7$ aldehydes, had a specific gravity of 0.792 and had a cobalt content of 0.203% was distilled at a reduced pressure of 13 to 17 mm. in a nitrogen atmosphere. Only 74% of the aldehydes present in the charge were recovered in the distillate which was of a yellow color (boiling range: 26–51° C. at 13 mm.). In spite of the short duration of the distillation (one hour) and a relatively low bottom temperature, it was found that 25% of the aldehydes in the charge were condensed to high boiling material. 29% of the cobalt complexes originally present in the charge passed overhead during distillation, the remainder was found in the still residue.

It is apparent from the foregoing example that relatively rapid distillation of the crude aldehyde results in a considerable loss of the aldehyde to condensation. Attempts to effect a more precise fractionation of the product results in a still greater loss.

Treatment of the crude aldehyde in accordance with the invention obviates substantially completely the difficulties attributable to at least a substantial degree to the presence of cobalt complexes of the form in which they are present in the crude aldehydic reaction products. Without intent to limit the scope of the invention by any theory advanced herein to set forth more fully its nature, it is believed that the pretreatment under the conditions of the present invention converts the cobalt complexes from the volatile and highly active form in which they are found in the crude aldehydic reaction products, to a relatively involatile and inactive cobalt-containing material incapable of promoting or catalyzing the aldehyde condensation reaction. The pretreatment prior to distillation makes possible the recovery of the aldehydes from the crude mixture by practical scale distillation means in the absence of any substantial amount of aldehyde condensation or cobalt carry-over. It has furthermore been found that the effect of the pretreatment of the crude aldehyde renders the cobalt-containing impurity particularly innocuous when the subsequent distillation is effected in the presence of steam.

Heating of the crude aldehyde prior to distillation in accordance with the invention is effected at a temperature in the range of, for example, from about 80 to about 160° C. and preferably at a temperature in the range of from about 125 to about 150° C. The heat treatment is effected in the presence of an added gaseous medium which is free of any substantial amount of carbon monoxide and which is relatively inert under the conditions of execution of the treatment. Suitable gaseous media comprise, for example, nitrogen, hydrogen, steam, the normally gaseous paraffins, etc. Heating in the presence of the gaseous medium in the prescribed temperature range is executed at a superatmospheric pressure not substantially in excess of about 60 atmospheres and preferably in the range of from about 25 to about 50 atmospheres. In a preferred method of carrying out the invention, the pretreatment is effected in the presence of hydrogen as the added gaseous medium at conditions within the prescribed range precluding any substantial hydrogenation of the aldehydes. Thus, the heating of crude aldehydes at temperatures in the range of from about 100 to about 150° C., at a pressure of 40 to 50 atmospheres in the presence of added hydrogen has been found highly effective.

The duration of the heating step may vary within the scope of the invention and is dependent to some degree upon the composition of the crude aldehyde and upon the degree of aldehyde recovery and absence of cobalt in the aldehydic product which is desired. In general heating times of from 30 minutes to about two hours have been found satisfactory. Lesser or longer preheating time may be resorted to, however, within the scope of the invention.

After thus heating the crude aldehydic reaction products under the prescribed conditions they are subjected to distillation to effect the separation of aldehydes therefrom. The distillation is preferably carried out in the presence of steam. It has been found that the crude aldehyde which has been pretreated in accordance with the invention can be subjected to distillation to effect the substantially complete separation of aldehydes therefrom, not only in the absence of any cobalt carry-over, but in the absence of any substantial condensation of the aldehydes. The recovery, in a high state of purity, of as much as from 95% to close to 100% of the aldehydic content of the crude synthetic aldehyde is made possible by the process of the invention.

The crude aldehyde need not be freed of entrained catalyst or complexes thereof often found in considerable amount in a suspended or precipitated state in the products of the reaction between carbon monoxide, hydrogen and an unsaturated compound carried out in the presence of a cobalt catalyst. Whereas subjection of such material to distillation will result in volatilization of the cobalt-containing materials and the formation of deposits upon the walls of the distillation apparatus and subsequent parts of equipment, the pretreatment of the crude aldehyde in accordance with the invention will result in the substantially complete elimination of these difficulties and with the maintaining of substantially all cobalt and compounds thereof in the still residue in the absence of any substantial aldehyde condensation.

A particular advantage of the invention resides in enabling the subjection of the pretreated crude aldehyde not only to a single distillation step but to the relatively severe distillation conditions often involving a plurality of distillation steps often necessary to obtain a product consisting essentially of a single aldehyde, without substantial loss of aldehydes due to condensation reactions. Resort to such more severe distillation conditions are found necessary, for example, when the crude aldehydic product is obtained by the reaction of a plurality of unsaturated compounds with the carbon monoxide and hydrogen. Thus, when a wide boiling olefinic fraction is employed as such unsaturated compounds the crude aldehydic products obtained will contain not only a plurality of aldehydes but also a smaller amount of a plurality of oxygen-containing reaction by-products boiling over a wide range and overlapping the boiling temperatures of the aldehydes.

The following examples are illustrative of efficiency with which aldehydes are recovered in accordance with the invention from crude aldehydic reaction products resulting from reaction between carbon monoxide, hydrogen and unsaturated compounds.

Example II

A separate portion of the same crude $C_7$-aldehyde-containing aldehydic reaction products employed as charge to the distillation step of the above Example I having a cobalt content of 0.203% was heated for one hour at 150° C. in the presence of hydrogen at a pressure in the range of from 40 to 50 atmospheres. The resulting pretreated crude aldehyde was distilled at 14 mm. pressure. A recovery of 92.5% of the $C_7$-aldehydes was obtained. The fraction of the distillate having a boiling range of from 30 to 80° C. at 14 mm. was found to contain no more than 0.002% of cobalt.

Example III

The crude aldehydic reaction products obtained by the reaction between carbon monoxide, hydrogen and isobutene in the presence of a cobalt catalyst was heated at a temperature of 150° C. at a pressure in the range of from 40 to 50 atmospheres in the presence of hydrogen. The resulting pretreated material had a $C_5$ aldehyde content of 77.8% and a cobalt content of about 0.005%. Subjection of the thus pretreated crude $C_5$-aldehyde to steam distillation resulted in obtaining a colorless aldehydic distillate with a $C_5$-aldehyde recovery of 99.8%. Drying the distillate with $Na_2SO_4$ and fractionation enabled the obtaining of a fraction consisting of 3-methyl butanol-1 of 98.4% purity with a recovery of 85.5%.

Example IV

Crude aldehydic reaction products obtained by the reaction between carbon monoxide, hydrogen, and an olefin in the presence of a cobalt catalyst and consisting of a predominant amount of the aliphatic aldehyde having one more carbon atom to the molecule than the olefin reacted with the carbon monoxide were heated at a temperature of 150° C. for a period of one hour in the presence of hydrogen at a pressure in the range of 40 to 50 atmospheres. After the heat treatment the crude aldehydic reaction products were subjected to a steam distillation. The steam distillate was dried with sodium sulfate and redistilled under reduced pressure in a nitrogen atmosphere. A narrow-boiling range fraction (b) consisting essentially of desired aldehydes was separately recovered during the redistillation of the steam distillate. Results obtained in each of three separate operations are indicated in the following table:

Table

| Olefin reacted with CO and $H_2$ to obtain crude aldehydic reaction product. | hexene | heptene | octene |
|---|---|---|---|
| Predominant component (a) of crude aldehydic reaction products | $C_7$ aldehydes | $C_8$ aldehydes | $C_9$ aldehydes |
| Aldehyde (a) content of heat treated crude aldehydic reaction product, per cent by wt. | 60.8 | 60.1 | 57.3 |
| Aldehyde (a) content of steam distillation distillate, per cent by wt. | 61.0 | 58.2 | 60.1 |
| Steam distillation residue, per cent wt. of charge | 13.4 | 8.9 | 7.6 |
| Aldehydes (a) recovered in steam distillate, per cent by wt. of steam distillation charge. | 87.3 | 88.3 | 96.7 |
| Pressure during redistillation of steam distillate, mm. Hg | 16 | 13 | 13 |
| Boiling range of main fraction (b) distilled from steam distillate, °C | 36-46 | 55-63 | 72-84 |
| Aldehyde (a) content of fraction (b) distilled from the steam distillate, per cent wt. of redistillation charge. | 97.4 | 96.5 | 97.4 |
| Per cent by wt. of aldehyde (a) in redistillation charge recovered in fraction (b). | 88.1 | 92.4 | 79.4 |

The distillate fractions obtained in each operation were substantially colorless and contained substantially only traces of cobalt.

The invention claimed is:

1. The process for the recovery of aldehydes having from six to ten carbon atoms to the molecule from crude aldehydic reaction products obtained by the interaction of carbon monoxide, hydrogen and an unsaturated organic compound having an olefinic unsaturation at an elevated temperature in the presence of a cobalt catalyst, said crude aldehydic reaction products comprising cobalt-containing impurities in contaminating amounts precluding distillation of aldehydes therefrom in the absence of substantial aldehyde condensation, which comprises preconditioning said crude aldehydic reaction products by heating them in the presence of a gaseous medium in the absence of any substantial amount of carbon monoxide at a temperature of from about 80 to 160° C. and a pressure of from about atmospheric to about 60 atmospheres in the absence of any substantial aldehyde hydrogenation, said gaseous medium being substantially inert at said preconditioning conditions, and distilling aldehydes from said preconditioned crude aldehydic reaction products in the absence of any substantial aldehyde condensation.

2. The process for the recovery of aldehydes having from six to ten carbon atoms to the molecule from crude aldehydic reaction products obtained by the reaction between carbon monoxide, hydrogen and an unsaturated organic compound having an olefinic unsaturation at an elevated temperature in the presence of a cobalt catalyst, said crude aldehydic reaction products comprising cobalt-containing impurities in contaminating amounts precluding distillation of aldehydes therefrom in the absence of substantial aldehyde condensation, which comprises preconditioning said crude aldehydic reaction products by heating them in the presence of hydrogen in the absence of any substantial amount of carbon monoxide at a temperature of from about 125 to about 150° C. and a pressure of from about 25 to above 50 atmospheres in the absence of any substantial aldehyde hydrogenation, and distilling aldehydes from said preconditioned crude aldehydic reaction products in the absence of any substantial aldehyde condensation.

3. The process for the recovery of aliphatic aldehydes having from six to ten carbon atoms to the molecule from crude aldehydic reaction products comprising them obtained by the reaction between carbon monoxide, hydrogen and an olefin at an elevated temperature in the presence of a cobalt catalyst, said crude aldehydic reaction products comprising cobalt-containing impurities in contaminating amounts precluding distillation of aldehydes therefrom in the absence of any substantial aldehyde condensation, which comprises preconditioning said crude aldehydic reaction products by heating them in the presence of a gaseous medium in the absence of any substantial amount of carbon monoxide at a temperature of from about 80 to about 160° C. and a pressure of from about 25 to about 60 atmospheres in the absence of any substantial aldehyde hydrogenation, said gaseous medium being substantially inert at said preconditioning conditions, and distilling aliphatic aldehyde from said preconditioned crude aldehydic reaction products in the absence of any substantial aldehyde condensation.

4. The process for the recovery of aliphatic aldehydes having at least about six carbon atoms to the molecule from crude aldhydic reaction products comprising them obtained by the reaction between carbon monoxide, hydrogen and an olefin at an elevated temperature in the presence of a cobalt catalyst, said crude aldehydic reaction products comprising cobalt in contaminating amounts precluding distillation of aldehydes therefrom in the absence of any substantial aldehyde condensation, which comprises preconditioning said crude aldehydic reaction products by heating them in the presence of hydrogen in the absence of any substantial amount of carbon monoxide at a temperature of from about 80 to about 160° C. and a pressure of from about 25 to about 60 atmospheres in the absence of any substantial aldehyde hydrogenation, and distilling aliphatic aldehydes from said preconditioned crude aldehydic reaction products in the absence of any substantial aldehyde condensation.

5. Process in accordance with claim 4 wherein said aliphatic aldehydes are distilled from said preconditioned crude aldehydic reaction products with the aid of steam.

6. Process in accordance with claim 5 wherein said preconditioning is executed at a temperature from about 125 to about 150° C.

7. Process in accordance with claim 6 wherein said olefin reacted with carbon monoxide and hydrogen is an olefin having from five to nine carbon atoms to the molecule and said aliphatic aldehydes have from six to ten carbon atoms to the molecule.

8. Process in accordance with claim 7 wherein said preconditioning is executed at a temperature of 150° C. and a pressure of 40 to 50 atmospheres.

NICOLAAS MAX.

REFERENCES CITED

The following references are of record in the file of this patent:

Holm et al., "The OXO Process," Fiat Final Report No. 1000, PB 81383, December 26, 1947, Office of Technical Services, Department of Commerce, Washington, D. C., Microfilm reel and photostats in Div. 31; pages 20 and 21.